United States Patent
Maruhashi (10) Patent No.: US 12,524,061 B2
(45) Date of Patent: Jan. 13, 2026

(54) ELECTRONIC DEVICE CAPABLE OF REDUCING POWER CONSUMPTION IN POWER SAVING MODE WITHOUT DEGRADING WAVEFORM QUALITY, AND OPERATION CONTROL METHOD

(71) Applicant: KYOCERA Document Solutions Inc., Osaka (JP)

(72) Inventor: Ken Maruhashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 104 days.

(21) Appl. No.: 18/756,413

(22) Filed: Jun. 27, 2024

(65) Prior Publication Data
US 2025/0013282 A1    Jan. 9, 2025

(30) Foreign Application Priority Data
Jul. 7, 2023   (JP) ................. 2023-111860

(51) Int. Cl.
*G06F 1/3234* (2019.01)
*H04N 1/00* (2006.01)

(52) U.S. Cl.
CPC ....... *G06F 1/3234* (2013.01); *H04N 1/00896* (2013.01); *H04N 2201/0094* (2013.01)

(58) Field of Classification Search
CPC ............... G06F 1/3234; G11C 11/4074; G11C 11/4072; G11C 5/147; G11C 5/148
See application file for complete search history.

(56) References Cited

U.S. PATENT DOCUMENTS

| | | | |
|---|---|---|---|
| 2011/0058217 A1 | 3/2011 | Saito | |
| 2019/0286219 A1* | 9/2019 | Anazawa | G06F 3/068 |
| 2020/0310971 A1* | 10/2020 | Cosby | G06F 1/28 |
| 2024/0055325 A1* | 2/2024 | Lv | H01L 25/065 |
| 2024/0363667 A1* | 10/2024 | Ota | H01L 23/522 |

FOREIGN PATENT DOCUMENTS

JP     2011059937 A    3/2011

\* cited by examiner

*Primary Examiner* — Raymond N Phan
(74) *Attorney, Agent, or Firm* — Alleman Hall & Tuttle LLP (57) ABSTRACT

An electronic device includes a substrate, a plurality of DRAMs, and a transition processing portion. The substrate includes a power supply layer adjacent to a wiring layer. The plurality of DRAMs are capable of transitioning from a first state in which data can be held to a second state in which data cannot be held and that consumes less power than the first state, and receive power from the power supply layer. The transition processing portion, in a case where an operating mode of the electronic device moves from a normal mode to power saving mode that consumes less power than the normal mode, stores return data used when returning to the normal mode in part of the plurality of DRAMs, and causes each of the DRAMs in which the return data is not stored to transition from the first state to the second state.

5 Claims, 5 Drawing Sheets

ELECTRONIC DEVICE CAPABLE OF REDUCING POWER CONSUMPTION IN POWER SAVING MODE WITHOUT DEGRADING WAVEFORM QUALITY, AND OPERATION CONTROL METHOD

INCORPORATION BY REFERENCE

This application is based upon and claims the benefit of priority from the corresponding Japanese Patent Application No. 2023-111860 filed on Jul. 7, 2023, the entire contents of which are incorporated herein by reference.

BACKGROUND

The present disclosure relates to an electronic device and an operation control method.

Electronic devices such as multifunction peripherals are known that can switch operating modes between a normal mode and a power saving mode that consumes less power than the normal mode. In addition, an electronic device capable of reducing power consumption during the power saving mode is known as related technology. More specifically, the electronic device according to the related technology includes a first power supply that supplies power to a first DRAM and a second power supply that supplies power to a second DRAM, and in a case where the operating mode of the electronic device moves from the normal mode to the power saving mode, data in the first DRAM is saved to the second DRAM, and power supply by the first power supply is stopped.

SUMMARY

An electronic device according to one aspect of the present disclosure includes a substrate, a plurality of DRAMs, and a transition processing portion. The substrate includes a power supply layer adjacent to a wiring layer. The plurality of DRAMs are capable of transitioning from a first state in which data can be held to a second state in which data cannot be held and that consumes less power than the first state, and receive power from the power supply layer. The transition processing portion, in a case where an operating mode of the electronic device moves from a normal mode to power saving mode that consumes less power than the normal mode, stores return data used when returning to the normal mode in part of the plurality of DRAMs, and causes each of the DRAMs in which the return data is not stored to transition from the first state to the second state.

An operation control method according to another aspect of the present disclosure is executed by an electronic device including a substrate including a power supply layer adjacent to a wiring layer, and a plurality of DRAMs capable of transitioning from a first state in which data can be held to a second state in which data cannot be held and that consumes less power than the first state, and configured to receive power from the power supply layer; and includes a transitioning step. In the transitioning step, in a case where an operating mode of the electronic device moves from a normal mode to a power saving mode that consumes less power than the normal mode, return data used when returning to the normal mode is stored in part of the plurality of DRAMs, and each of the DRAMs in which the return data is not stored is caused to transition from the first state to the second state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the accompanying drawings. Note that the following embodiments are examples of embodying a technique according to the present disclosure, and do not limit the technical scope of the present disclosure.

[Configuration of Image Forming Apparatus 100]

First, a configuration of an image forming apparatus 100 of an embodiment according to the present disclosure will be described with reference to FIGS. 1 and 2. Here, FIG. 1 is a cross-sectional view showing the configuration of the image forming apparatus 100.

The image forming apparatus 100 is a multifunction peripheral that has multiple functions such as a scanning function for reading an image of a document, a printing function for forming an image on a sheet based on image data, a fax function, and a copying function. The image forming apparatus 100 is an example of an electronic device according to the present disclosure. Note that the technique according to the present disclosure is applicable to electronic devices such as scanners, printers, fax machines, copy machines, personal computers, notebook computers, smartphones, tablet terminals, televisions, air conditioners, refrigerators, washing machines, and the like.

Figure 1:
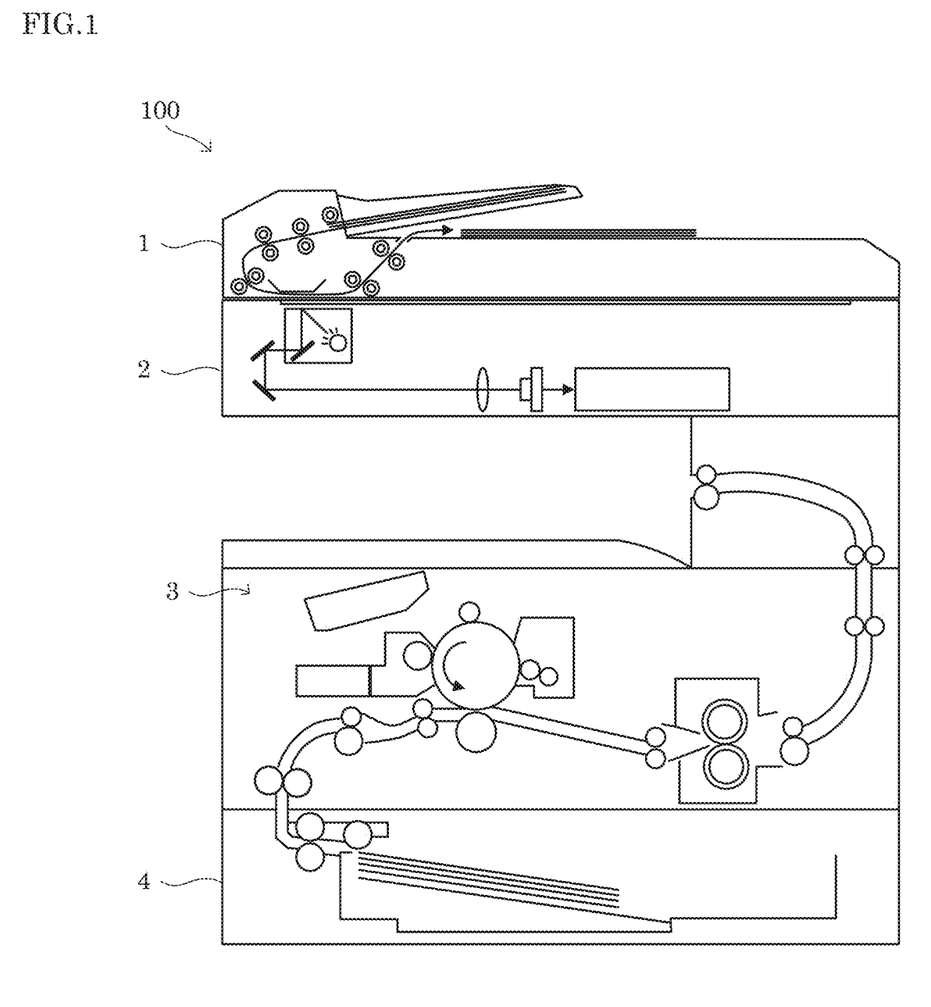
FIG. 1 is a diagram showing a configuration of an image forming apparatus of an embodiment according to the present disclosure.
Figure 2:
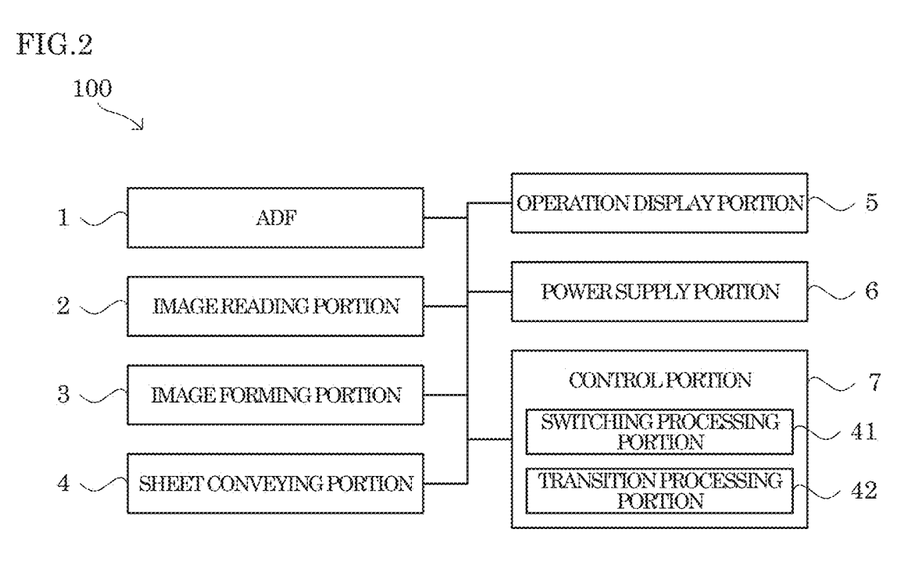
FIG. 2 is a block diagram showing a system configuration of an image forming apparatus of an embodiment according to the present disclosure.

As shown in FIGS. 1 and 2, the image forming apparatus 100 includes an auto document feeder (ADF) 1, an image reading portion 2, an image forming portion 3, a sheet conveying portion 4, an operation display portion 5, a power supply portion 6, and a control portion 7.

The ADF 1 conveys a document to be read as a reading target by the scanning function. The ADF 1 includes a document setting portion, a plurality of conveying rollers, a document holder, and a sheet discharge portion.

The image reading portion 2 achieves the scanning function. The image reading portion 2 includes a document table, a light source, a plurality of mirrors, an optical lens, and a charge coupled device (CCD).

The image forming portion 3 achieves the printing function. More specifically, the image forming portion 3 forms an image on a sheet using an electrophotographic method. The image forming portion 3 includes a photoconductor drum, a charging device, a laser scanning unit (LSU), a developing device, a transfer device, a cleaning device, and a fixing device.

The sheet conveying portion 4 conveys a sheet on which an image is formed by the image forming portion 3. The sheet conveying portion 4 includes a sheet feed cassette and a plurality of conveying rollers.

The operation display portion 5 is a user interface of the image forming apparatus 100. The operation display portion 5 includes a display portion and an operation portion. The display portion displays various types of information according to control instructions from the control portion 7. For example, the display portion is a liquid crystal display. The operation portion inputs various types of information to the control portion 7 according to a user operation. For example, the operation portion is a touch panel.

The power supply portion 6 supplies power supplied from an external commercial power source to each portion of the image forming apparatus 100. More specifically, the power supply portion 6 is an AC to DC converter that converts an AC voltage of 100V supplied from the commercial power source into a DC voltage of a predetermined voltage value.

The control portion 7 performs overall control of the image forming apparatus 100.

[Configuration of Control Portion 7]

Figure 3:
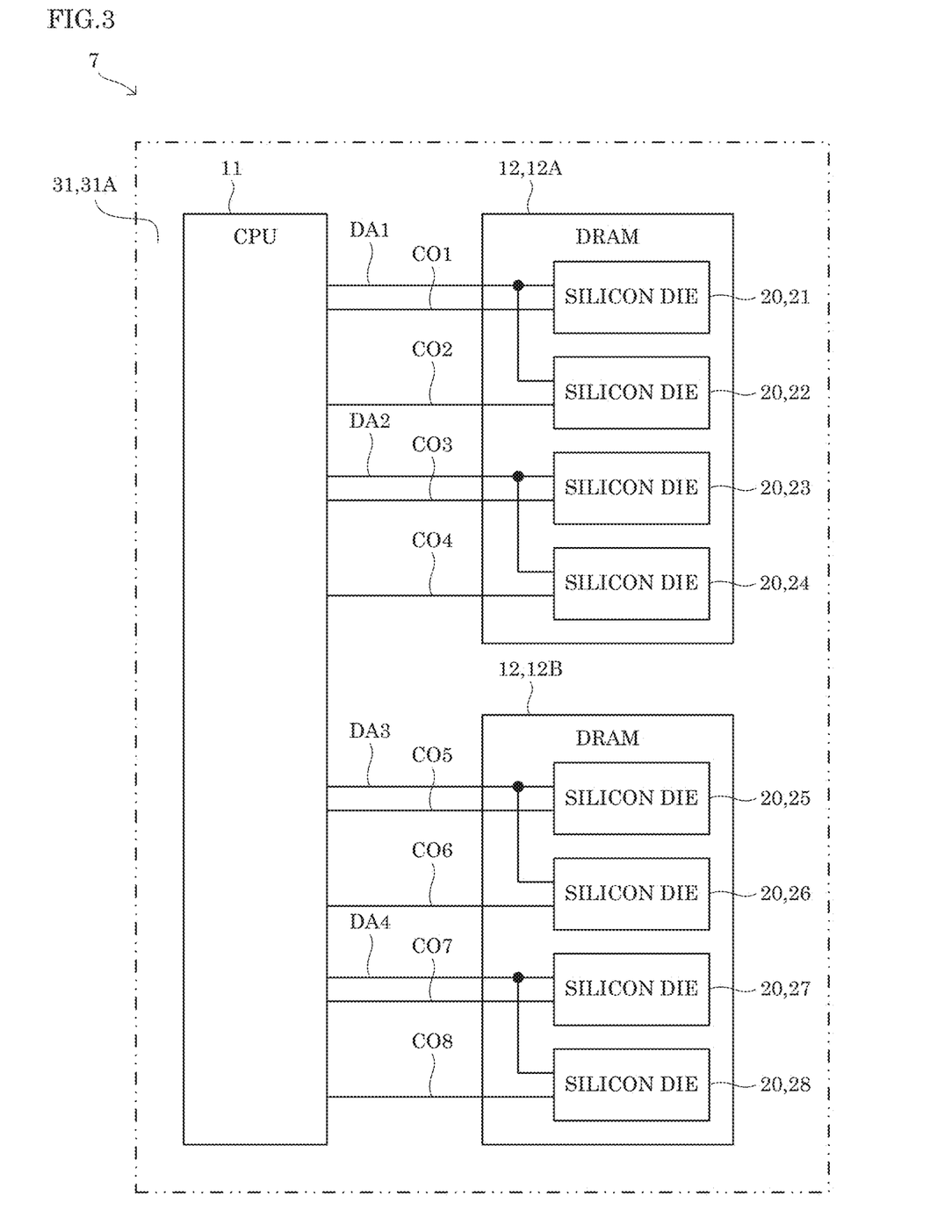
FIG. 3 is a diagram showing a configuration of a control portion of an image forming apparatus of an embodiment according to the present disclosure.
Figure 4:
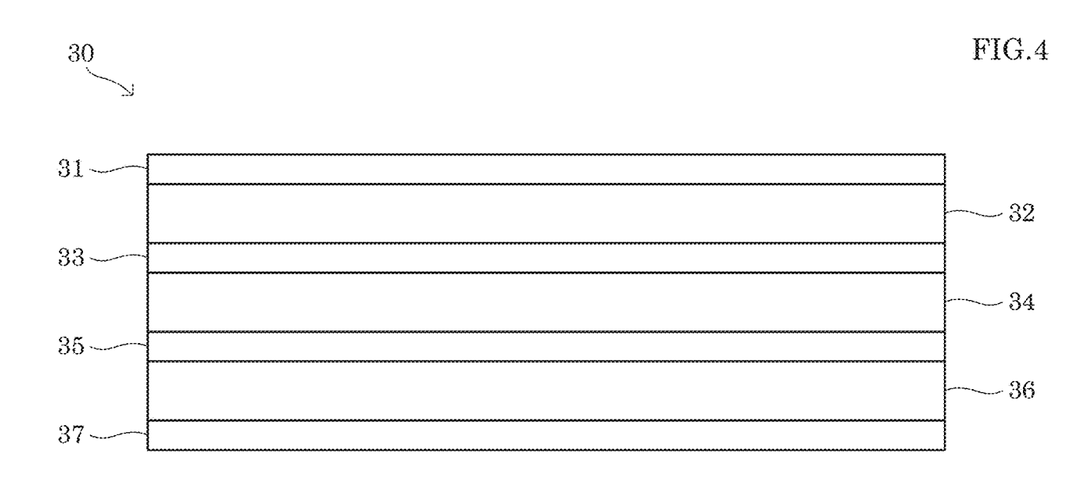
FIG. 4 is a diagram showing a configuration of a control board of an image forming apparatus of an embodiment according to the present disclosure.

Next, a configuration of the control portion 7 will be explained with reference to FIGS. 2 to 4. Here, FIG. 3 is a plan view showing a configuration of a part of a first wiring layer 31 of a control board 30. In addition, FIG. 4 is a side view showing a configuration of the control board 30.

The control portion 7 includes a plurality of electronic components including a CPU 11 shown in FIG. 3 and two dynamic random access memories (DRAM) 12 (12A, 12B). In addition, the control portion 7 includes the control board 30 (see FIG. 4) on which a plurality of the electronic components are mounted.

The control board 30 is a multilayer board. As shown in FIG. 4, the control board 30 includes a first wiring layer 31, a first insulating layer 32, a power supply layer 33, a second insulating layer 34, a ground layer 35, a third insulating layer 36, and a second wiring layer 37. The control board 30 is an example of a substrate according to the present disclosure.

The first wiring layer 31 forms one outer surface of the control board 30. A wiring pattern is formed in the first wiring layer 31. A plurality of the electronic components including the CPU 11 and two DRAMs 12 are mounted in the first wiring layer 31. In FIG. 3, an area 31A in the first wiring layer 31 where the CPU 11 and two DRAMs 12 are mounted is indicated by a two-dot chain line.

The power supply layer 33 is provided adjacent to the first wiring layer 31. More specifically, as shown in FIG. 4, the power supply layer 33 is provided facing the first wiring layer 31 with the first insulating layer 32 in between. A power supply plane is formed in the power supply layer 33. The CPU 11 and the two DRAMs 12 are electrically connected to the power supply layer 33 and receive power from the power supply layer 33.

The ground layer 35 is provided adjacent to the power supply layer 33. More specifically, as shown in FIG. 4, the ground layer 35 is provided facing the power supply layer 33 with the second insulating layer 34 in between. A ground plane is formed in the ground layer 35. The CPU 11 and the two DRAMs 12 are electrically connected to the ground layer 35.

The second wiring layer 37 forms an other outer surface of the control board 30. As shown in FIG. 4, the second wiring layer 37 is provided facing the ground layer 35 with the third insulating layer 36 in between. A wiring pattern is formed in the second wiring layer 37.

The first insulating layer 32, the second insulating layer 34, and the third insulating layer 36 are formed of an insulator.

The CPU 11 is a processor that executes various types of calculation processes. The CPU 11 executes various types of calculation processes by executing a control program stored in advance in a ROM (not shown) included in the plurality of electronic components.

For example, the CPU 11, by executing the control program, functions as a switching processing portion 41 shown in FIG. 2.

The switching processing portion 41 switches an operating mode of the image forming apparatus 100 between a normal mode and a power saving mode that consumes less power than the normal mode. In the power saving mode, power supply to some of the components of the image forming apparatus 100 is stopped.

More specifically, in a case where the operating mode is the normal mode and a predetermined transition conditions is satisfied, the switching processing portion 41 switches the operating mode from the normal mode to the power saving mode.

For example, the transition condition includes a first transition condition and a second transition condition. The switching processing portion 41 switches the operating mode to the power saving mode when either the first transition condition or the second transition condition is satisfied. The first transition condition is that a no-operation state in which no operation input is performed to the image forming apparatus 100 continues for a predetermined period of time. The second transition condition is that an input operation of an instruction to transition to the power saving mode is performed on the operation display portion 5. Note that the transition condition may include conditions different from those described above.

In addition, in a case where the operating mode is the power saving mode and a predetermined return condition is satisfied, the switching processing portion 41 switches the operating mode from the power saving mode to the normal mode.

For example, the return condition includes a first return condition and a second return condition. The switching processing portion 41 switches the operating mode to the normal mode when either the first return condition or the second return condition is satisfied. The first return condition is that an image forming job transmitted from an external information processing device is received. The second return condition is that an operation is performed on the operation display portion 5. Note that the return condition may include conditions different from those described above.

In a case of switching the operating mode from the normal mode to the power saving mode, the switching processing portion 41 inputs a control signal (not shown) to that effect to the power supply portion 6 and stops power supply to some of the components of the image forming apparatus 100. In addition, in a case of switching the operating mode from the power saving mode to the normal mode, the switching processing portion 41 inputs a control signal (not shown) to that effect to the power supply unit 6 and restores the power supply to the some components of the image forming apparatus 100.

Each of the DRAMs 12 is a volatile memory. The two DRAMs 12 are used as temporary storage memories (work areas) for various types of processes executed by the CPU 11.

More specifically, each of the DRAMs 12 is a low power double data rate 4 (LPDDR4). Note that each of the DRAMs 12 may be a double data rate 4 synchronous dynamic random access memory (DDR4-SDRAM) or the like.

Electronic devices that are capable of reducing power consumption during the power saving mode are known as related technology. More specifically, an electronic device according to related technology includes a first power supply that supplies power to the DRAM 12A and a second power supply that supplies power to the DRAM 12B, and in a case where the operating mode of the device moves from the normal mode to the power saving mode, data in the DRAM 12A is saved to the DRAM 12B and the power supply by the first power source is stopped.

Here, in the image forming apparatus 100, the two DRAMs 12 receive power supplied from a power supply layer 33 that functions as a reference layer for the first wiring layer 31 in the control board 30. In order to apply the related technology to an image forming apparatus 100 having such a configuration, it is necessary to divide the power supply layer 33. However, when the power supply layer 33 that functions as the reference layer for the first wiring layer 31 is divided, a return path of the current flowing in the first wiring layer 31 becomes discontinuous, and the waveform quality of a signal transmitted in the first wiring layer 31 may deteriorate.

In contrast, the image forming apparatus 100 of an embodiment according to the present disclosure is capable of reducing power consumption during the power saving mode without reducing waveform quality, as will be described below.

More specifically, in each of the DRAMs 12, the operation state can be transitioned between a first state, a second state, and a third state.

Here, the first state is a state in which data can be held and the data can be read and written. In the first state, a refresh operation is periodically executed to continue holding data.

In addition, the third state is a state in which data can be held, but data cannot be read or written. In the third state, the refresh operation is periodically executed. The third state consumes less power than the first state. The third state is a state called "self-refresh mode" or the like. Note that the third state may be included in the first state according to the present disclosure.

In addition, the second state is a state in which data cannot be held. In the second state, the refresh operation is not executed periodically. The second state consumes less power than the first state and the third state. The second state is a state called "power down mode" or the like.

In addition, in each of the DRAMs 12, a part of the operating state thereof can be transitioned between the first state, the second state, and the third state.

For example, as shown in FIG. 3, each of the DRAMs 12 includes four silicon dies 20. Four silicon dies 20 are provided within the DRAM 12 package. Each silicon die 20 constitutes a part of the DRAM 12. Each silicon die 20 includes a large number of memory cells and is capable of storing data. In each silicon die 20, the operating state can be transitioned between the first state, the second state, and the third state. The silicon die 20 is an example of a data storage portion according to the present disclosure.

As shown in FIG. 3, the DRAM 12A includes silicon dies 21 to 24. The silicon die 21 and the silicon die 22 are connected to the CPU 11 via a data signal line DA1 (see FIG. 3). In addition, the silicon die 23 and the silicon die 24 are connected to the CPU 11 via a data signal line DA2 (see FIG. 3). Moreover, the silicon die 21 is connected to the CPU 11 via a control signal line CO1 (see FIG. 3). Furthermore, the silicon die 22 is connected to the CPU 11 via a control signal line CO2 (see FIG. 3). In addition, the silicon die 23 is connected to the CPU 11 via a control signal line CO3 (see FIG. 3). Moreover, the silicon die 24 is connected to the CPU 11 via a control signal line CO4 (see FIG. 3).

In addition, as shown in FIG. 3, the DRAM 12B includes silicon dies 25 to 28. The silicon die 25 and the silicon die 26 are connected to the CPU 11 via a data signal line DA3 (see FIG. 3). In addition, the silicon die 27 and the silicon die 28 are connected to the CPU 11 via a data signal line DA4 (see FIG. 3). Moreover, the silicon die 25 is connected to the CPU 11 via a control signal line CO5 (see FIG. 3). Furthermore, the silicon die 26 is connected to the CPU 11 via a control signal line CO6 (see FIG. 3). In addition, the silicon die 27 is connected to the CPU 11 via a control signal line CO7 (see FIG. 3). Moreover, the silicon die 28 is connected to the CPU 11 via a control signal line CO8 (see FIG. 3).

The control signal lines CO1 to CO8 are used to specify the silicon die 20 from which data is to be read or written to. In addition, the control signal lines CO1 to CO8 are used to control the operating state of each silicon die 20. Moreover, the data signal lines DA1 to DA4 are used for transmitting and receiving data.

Furthermore, as shown in FIG. 2, the control portion 7 includes a transition processing portion 42.

More specifically, the ROM of the control portion 7 stores in advance an operation control program for causing the CPU 11 of the control portion 7 to function as the transition processing portion 42. The CPU 11 of the control portion 7 functions as the transition processing portion 42 by executing the operation control program stored in the ROM. Note that the transition processing portion 42 may be configured by an electronic circuit. In addition, the operation control program may be a program for causing a plurality of processors to function as the transition processing portion 42.

In a case where the operating mode of the image forming apparatus 100 moves from the normal mode to the power saving mode, the transition processing portion 42 stores return data to be used when returning to the normal mode in a part of the plurality of DRAMs 12, and causes each DRAM 12 in which the return data is not stored to transition from the first state to the second state.

In addition, the transition processing portion 42 causes each silicon die 20 in which the return data is not stored and that is included in the DRAM 12 in which the return data is stored, to transition from the first state to the second state.

Moreover, the transition processing portion 42 causes each silicon die 20 in which the return data is stored to transition from the first state to the third state.

For example, the transition processing portion 42 generates the return data in a case where the operating mode of the image forming apparatus 100 moves from the normal mode to the power saving mode. For example, the transition processing portion 42 deletes a specific type of data that is predetermined as having low importance, such as cache data, from among the data stored in the two DRAMs 12. The transition processing portion 42 generates the return data by compressing the data remaining after the specific type of data is deleted.

In addition, the transition processing portion 42 determines a storage destination for the generated return data. More specifically, in order to minimize the number of silicon dies 20 in which the return data is stored, the transition processing portion 42, based on the data amount of the return data, determines one or more of the eight silicon dies 20 as the storage destination for the return data.

Moreover, the transition processing portion 42 stores the return data in each of the one or more silicon dies 20 determined as the storage destination.

The transition processing portion 42 executes a first state transition process that causes each of the silicon dies 20 in which the return data is stored to transition from the first state to the third state, and causes each silicon die 20 in which the return data is not stored to transition from the first state to the second state.

Note that each silicon die 20 does not need to be able to transition to the third state. In this case, the transition processing portion 42 does not need to cause each silicon die 20 in which the return data is stored to transition from the first state to the third state.

In addition, each of the DRAMs 12 may not be able to partially transition the operation state thereof. In this case, the transition processing portion 42 does not need to cause each silicon die 20 in which the return data is not stored and that is included in the DRAM 12 in which the return data is stored, to transition from the first state to the second state.

[Operation Control Process]

Figure 5:
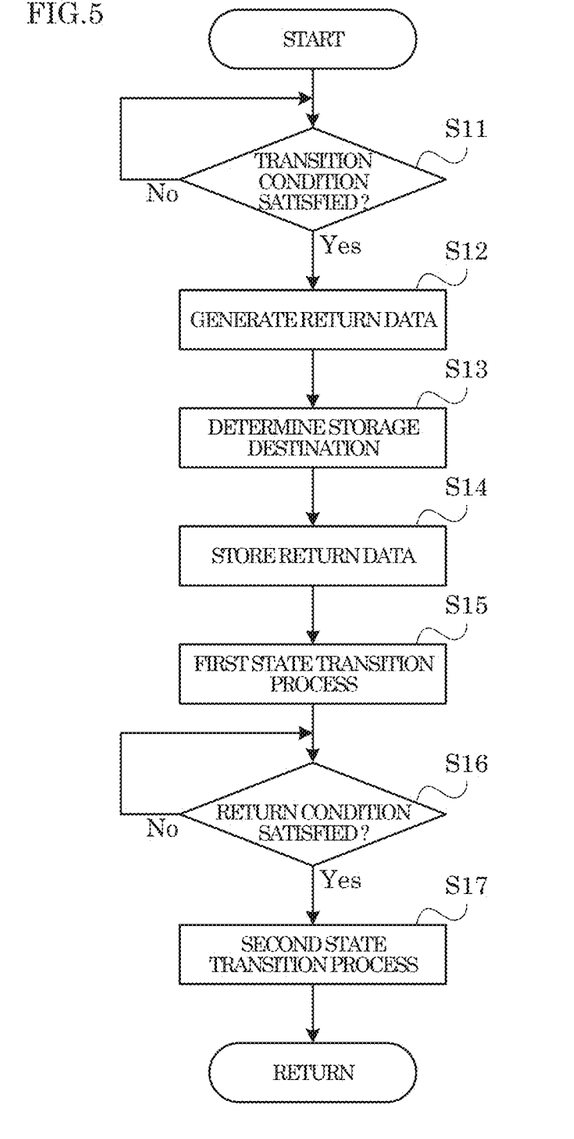
FIG. 5 is a flowchart showing an example of an operation control process executed by an image forming apparatus of an embodiment according to the present disclosure.

In the following, with reference to FIG. 5, an example of a procedure of the operation control process executed by the control portion 7 in the image forming apparatus 100, and an operation control method according to the present disclosure will be described. Here, steps S11, S12, and so on represent numbers of processing procedures (steps) executed by the control portion 7.

Step S11

First, in step S11, the control portion 7 determines whether or not the transition condition is satisfied.

More specifically, the control portion 7 determines that the transition condition is satisfied when either the first transition condition or the second transition condition is satisfied.

Here, when the control portion 7 determines that the transition condition is satisfied (YES side of S11), the control portion 7 moves the process to step S12. In addition, when the transition condition is not satisfied (NO side of S11), the control portion 7 waits for the transition condition to be satisfied in step S11.

Step S12

In step S12, the control portion 7 generates the return data.

More specifically, the control portion 7 deletes the specific type of data from among the data stored in the two DRAMs 12. The control portion 7 generates the return data by compressing the data remaining after the specific type of data is deleted.

Step S13

In step S13, the control portion 7 determines the storage destination of the return data generated in the process of step S12.

More specifically, in order to minimize the number of silicon dies 20 in which the return data is stored, the control portion 7, based on the data amount of the return data, determines one or more of the eight silicon dies 20 as the storage destination for the return data.

Step S14

In step S14, the control portion 7 stores the return data in the storage destination determined in the process of step S13.

Step S15

In step S15, the control portion 7 executes the first state transition process. Here, the processing from step S11 to step S15 is an example of a transition step according to the present disclosure, and is executed by the transition processing portion 42 of the control portion 7.

Thus, of the eight silicon dies 20 included in the two DRAMs 12, each of the silicon dies 20 in which the return data is not stored is transitioned to the second state. In addition, of the eight silicon dies 20, each of the silicon dies 20 in which the return data is stored is transitioned to the third state. Therefore, the power consumption in the two DRAMs 12 during the power saving mode is suppressed to a necessary minimum.

Note that the switching processing portion 41 of the control portion 7 switches the operating mode of the image forming apparatus 100 from the normal mode to the power saving mode after executing the process of step S15.

Step S16

In step S16, the control portion 7 determines whether or not the return condition is satisfied.

More specifically, the control portion 7 determines that the return condition is satisfied when either the first return condition or the second return condition is satisfied.

Here, when the control portion 7 determines that the return condition is satisfied (YES side of S16), the control portion 7 moves the process to step S17. In addition, when the return condition is not satisfied (NO side of S16), the control portion 7 waits for the return condition to be satisfied in step S16.

Step S17

In step S17, the control portion 7 executes a second state transition process that causes each of the silicon dies 20 in which the return data is stored to transition from the third state to the first state, and causes each silicon die 20 in which the return data is not stored to transition from the second state to the first state.

Note that after executing the process in step S17, the switching processing portion 41 of the control portion 7 switches the operating mode of the image forming apparatus 100 from the power saving mode to the normal mode using the return data.

In this manner, in the image forming apparatus 100, in a case where the operating mode moves from the normal mode to the power saving mode, the return data is stored in part of the plurality of DRAMs 12, and each of the DRAMs 12 in which the return data is not stored is transitioned from the first state to the second state. Thus, power consumption during the power saving mode can be reduced without dividing the power supply layer 33. Therefore, compared to a configuration in which the power layer 33 is divided, power consumption during the power saving mode can be reduced without the waveform quality deteriorating.

Note that the number of DRAMs 12 included in the control portion 7 may also be three or more. In addition, the number of silicon dies 20 included in each DRAM 12 may be two or more.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An electronic device comprising:
a substrate including a power supply layer adjacent to a wiring layer;
a plurality of DRAMs capable of transitioning from a first state in which data can be held to a second state in which data cannot be held and that consumes less power than the first state, and configured to receive power from the power supply layer; and
a transition processing portion that, in a case where an operating mode of the electronic device moves from a normal mode to power saving mode that consumes less power than the normal mode, is configured to store return data used when returning to the normal mode in part of the plurality of DRAMs, and cause each of the DRAMs in which the return data is not stored to transition from the first state to the second state.

2. The electronic device according to claim 1, wherein
each of the DRAMs includes a plurality of data storage portions capable of transitioning between the first state and the second state; and
the transition processing portion causes each data storage portion in which the return data is not stored and that is included in the DRAM in which the return data is stored to transition from the first state to the second state.

3. The electronic device according to claim 1, further comprising
one or both of an image reading portion configured to read an image on a document and an image forming portion configured to form an image on a sheet.

4. The electronic device according to claim 2, wherein
each data storage portion is capable of transitioning to a third state in which data can be held and that consumes less power than the first state; and
the transition processing portion causes each data storage portion in which the return data is stored to transition from the first state to the third state.

5. An operation control method executed by
an electronic device comprising a substrate including a power supply layer adjacent to a wiring layer, and a plurality of DRAMs capable of transitioning from a first state in which data can be held to a second state in which data cannot be held and that consumes less power than the first state, and configured to receive power from the power supply layer; the operation control method comprising:
a transitioning step of, in a case where an operating mode of the electronic device moves from a normal mode to power saving mode that consumes less power than the normal mode, storing return data used when returning to the normal mode in part of the plurality of DRAMs, and causing each of the DRAMs in which the return data is not stored to transition from the first state to the second state.

* * * * *